United States Patent
Kopetz

(10) Patent No.: US 9,898,924 B2
(45) Date of Patent: Feb. 20, 2018

(54) METHOD FOR THE RELIABLE TRANSPORT OF ALARM MESSAGES IN A DISTRIBUTED COMPUTER SYSTEM

(71) Applicant: FTS COMPUTERTECHNIK GMBH, Vienna (AT)

(72) Inventor: Hermann Kopetz, Baden (AT)

(73) Assignee: FTS Computertechnik GmbH, Vienna (AT)

(*) Notice: Subject to any disclaimer, the term of this patent is extended or adjusted under 35 U.S.C. 154(b) by 0 days.

(21) Appl. No.: 15/445,224

(22) Filed: Feb. 28, 2017

(65) Prior Publication Data

US 2017/0256158 A1    Sep. 7, 2017

(30) Foreign Application Priority Data

Mar. 1, 2016   (AT) .............................. A 50158/2016

(51) Int. Cl.
*G08B 29/00* (2006.01)
*G08B 29/18* (2006.01)
(Continued)

(52) U.S. Cl.
CPC .......... *G08B 29/185* (2013.01); *G06F 11/261* (2013.01); *H04L 41/069* (2013.01);
(Continued)

(58) Field of Classification Search
CPC ... G08B 29/185; G06F 11/261; H04L 41/069; H04L 67/10; H04L 41/0681; H04L 67/12
See application file for complete search history.

(56) References Cited

U.S. PATENT DOCUMENTS

2010/0295677 A1*  11/2010  Egawa ..................... G08B 3/10
                                                          340/540
2013/0142204 A1    6/2013  Kopetz
(Continued)

FOREIGN PATENT DOCUMENTS

DE     102012004854 A1    9/2013
WO       2007/020182 A1    2/2007
(Continued)

OTHER PUBLICATIONS

Decision to Grant issued in Austrian Application No. A 50158/2016, dated May 2, 2017 (2 pages).
(Continued)

*Primary Examiner* — Erin M File
(74) *Attorney, Agent, or Firm* — Eversheds Sutherland (US) LLP

(57) ABSTRACT

The invention relates to a method for the reliable transport of alarm messages in a distributed computer system, said computer system comprising components, in particular a plurality of components, the components being node computers, distributor units, sensors—preferably intelligent sensors—and actuators—preferably intelligent actuators—and all components having access to a global time of known precision, and the node computers, intelligent sensors and intelligent actuators exchanging messages via the distributor units. It is provided that the computer system includes intelligent alarm sensors or intelligent alarm sensors are assigned to the computer system, and an intelligent alarm sensor transmits two types of time-triggered messages, alarm messages having an alarm transport period prescribed a priori, and error detection messages having an error detection period prescribed a priori, and the time stamps for the occurrence of alarm events are included in an alarm monitoring interval, the alarm monitoring interval ending directly before the transmission of the alarm message and
(Continued)

Figure 1:
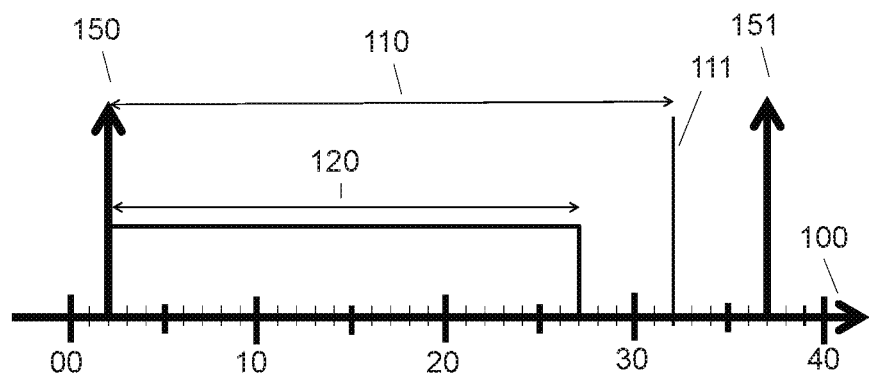

being at least twice as long as the alarm transport period, and an alarm message only being transmitted if at least one time stamp of an alarm event is included in the alarm message, and the current states of all alarms that are active immediately before the transmission of the error detection message are included in the periodic error detection messages.

14 Claims, 2 Drawing Sheets

(51) Int. Cl.
    *H04L 12/24*     (2006.01)
    *H04L 29/08*     (2006.01)
    *G06F 11/26*     (2006.01)

(52) U.S. Cl.
    CPC .......... *H04L 41/0681* (2013.01); *H04L 67/10* (2013.01); *H04L 67/12* (2013.01)

(56) References Cited

U.S. PATENT DOCUMENTS

| | | |
|---|---|---|
| 2015/0043360 A1 | 2/2015 | Poledna |
| 2015/0242822 A1* | 8/2015 | Magara ............ G06Q 10/06311 |
| | | 705/305 |
| 2017/0132890 A1* | 5/2017 | Hicks, III ........ G08B 13/19697 |
| 2017/0206758 A1* | 7/2017 | Wilson ................... G08B 13/14 |

FOREIGN PATENT DOCUMENTS

| | | |
|---|---|---|
| WO | 2012/085744 A2 | 2/2007 |
| WO | 2015/164897 A1 | 11/2015 |

OTHER PUBLICATIONS

European Search Report issued in Application No. 17158304.0, dated May 19, 2017 (5 pages).
Kopetz, Real-Time Systems, Design Principles for Distributed Embedded Applications, Springer, 2nd Edition (pp. 56-57) (2011).
Time Triggered Ethernet, Aerospace Standard AS6802, SAE International, pp. 1-108 (2011).

\* cited by examiner

METHOD FOR THE RELIABLE TRANSPORT OF ALARM MESSAGES IN A DISTRIBUTED COMPUTER SYSTEM

The invention relates to a method for the reliable transport of alarm messages in a distributed computer system, said computer system comprising components, in particular a plurality of components, the components being node computers, distributor units, sensors—preferably intelligent sensors—and actuators—preferably intelligent actuators—and all components having access to a global time of known precision, and the node computers, intelligent sensors and intelligent actuators exchanging messages via the distributor units.

The invention further relates to a distributed computer system, said computer system comprising components, in particular a plurality of components, the components being node computers, distributor units, sensors—preferably intelligent sensors—and actuators—preferably intelligent actuators—and all components having access to a global time of known precision, and the node computers, intelligent sensors and intelligent actuators exchanging messages via the distributor units.

The invention is within the field of computer technology. It relates to a method and a computer system for the reliable transport of alarm messages in a distributed real-time computer system from intelligent alarm sensors to an alarm center.

In a large industrial plant, a plurality of possible alarm messages, which hold information about anomalies or errors, are recorded by the existing instrumentation. Alarms that occur must be reliably and quickly transported in alarm messages from the distributed real-time computer system to an alarm center in order to locate the cause of the alarm following an in-depth analysis and to initiate suitable measures for error handling.

A distributed real-time computer system is made up of a plurality of components, including node computers, distributor units and intelligent sensors/actuators.

We refer to an intelligent sensor that can record an alarm event as an intelligent alarm sensor. It is assumed that all components, i.e. even all alarm sensors, have access to a global time of known precision.

The functional combination of a physical sensor with a node computer is referred to as an intelligent sensor. Intelligent sensors are frequently offered on the market as compact modules having an interface with a standardized real-time communication system.

The functional combination of a physical actuator with a node computer is referred to as an intelligent actuator. Intelligent actuators are frequently offered on the market as compact modules, preferably having an interface with a standardized real-time communication system.

While in normal mode alarms occur relatively infrequently, a serious error in a system can trigger a large amount (an alarm storm, see [1]) of almost simultaneous alarm events.

The technical challenge when designing an alarm system is the requirement of burdening the communication system as little as possible in normal mode and in the event of an alarm storm being able to reliably report the exact instants of all alarms that occur within a brief prescribed real-time constraint to the alarm center.

The object of the present invention is to specify a solution for this problem.

This objective is achieved via a method and computer system mentioned at the outset by the computer system comprising intelligent alarm systems in a manner according to the invention or intelligent alarm sensors being assigned to the computer system, and wherein an intelligent alarm sensor transmits two types of time-triggered messages, alarm messages having an alarm transport period prescribed a priori, and error detection messages having an error detection period prescribed a priori, and the time stamps for the occurrence of alarm events are included in an alarm monitoring interval, the alarm monitoring interval ending directly before the transmission of the alarm message and being at least twice as long as the alarm transport period, and an alarm message only being transmitted if at least one time stamp of an alarm event is included in the alarm message, and the current states of all alarms that are active immediately before the transmission of the error detection message are included in the periodic error detection messages.

According to the present invention, it is determined that an intelligent alarm sensor transmits two types of time-triggered messages: alarm messages having an alarm transport period prescribed a priori and error detection messages having an error detection period prescribed a priori.

The error detection period is preferably longer, in particular substantially longer than the alarm transport period.

Advantageous embodiments of the method and computer system according to the invention, in particular real-time computer system, are described below, wherein these features can each be provided by itself or in any combination with one or a plurality of the further features:

- the position of the time stamp of an alarm event in an alarm message determines the significance of the alarm event;
- the transmission instant of an alarm message determines the epochs for the time stamp of the alarm events that are contained in this alarm message, the time stamps of the alarm events being expressed in relation to these epochs;
- the global time of the transmission instant of a sporadic alarm message is contained in this alarm message;
- the instants of the transmission of a plurality of alarm messages that are to be transmitted to the same distributor unit are synchronized in such a manner that the alarm messages arrive at the distributor unit simultaneously, and the contents of the plurality of simultaneously arriving alarm messages are combined into a new alarm message and in some cases are transmitted further;
- the authenticity and integrity of the data content of an alarm message is protected by an electronic signature, and this signature is transmitted in the subsequent alarm message;
- the communication is regulated between the components by the TT-Ethernet protocol.

In an alarm message, the time stamps of the occurrence of the alarm events is contained in the immediately preceding alarm monitoring interval. The alarm monitoring interval determined a priori defines a time interval in which alarm events are monitored. The alarm monitoring interval ends immediately before the transmission of an alarm message and is at least twice as long as the alarm transport periods. This length requirement ensures that an alarm event that occurs is contained in at least two alarm messages and, as a result, the failure of one alarm message can be tolerated.

The transmission instant of an alarm message that is planned a priori determines the epochs [2, p. 56] and is the reference point for the time measurement of the time stamps of the alarm events contained in the alarm message. This determination of the epochs minimizes the required length of the time stamps of the alarm events contained in the alarm message.

If, for example, the granularity of the global time is 1 μsec, the alarm transport period is 1 msec and the alarm monitoring interval is 3 msec, the time stamp of an alarm event can be coded in a 12-bit field.

The meaning of a time stamp is derived from the prescribed position of the time stamp of an alarm event in the alarm message.

If, for example, an intelligent alarm sensor can monitor 100 different alarms, the data field of the corresponding alarm message has a length of 1200 bits, which is 150 bytes.

Preferably, an alarm message is only transmitted if at least one time stamp of an alarm event is contained in the alarm message. Therefore, if no new alarms occur within the alarm monitoring interval, no alarm message is transmitted.

If, for example, a TT-Ethernet protocol is used for data transmission, the unused bandwidth can be used in normal mode, i.e. when no alarms occur, for the transport of event-controlled Ethernet messages.

If no alarm message arrives in the alarm center during a longer time interval, a decision cannot be made as to whether no alarms have occurred or the intelligent alarm sensor has failed. For this reason, each intelligent alarm sensor periodically transmits an error detection message having an error detection period prescribed a priori. A failure of the intelligent alarm sensor is thus recognized in the alarm center within a prescribed error latency. The state of each alarm observed before the transmission instant is indicated in the data field of the error detection message.

The invention is explained in detailed below with reference to the drawings. Shown in the drawings are FIG. 1 the time sequence of an alarm signal, FIG. 2 a sequence of alarm messages and alarm monitoring intervals, and FIG. 3 the network topology of an exemplary distributed computer system.

Distinctions are made below between the terms alarm, alarm event, alarm state and active interval of the alarm. The term alarm refers to a well-defined binary signal that indicates a dangerous or anomalous state. The beginning of an alarm state is referred to as an alarm event; the duration of the alarm state as the active interval of the alarm. The minimum interval between two alarm events that relate to the same alarm is referred to as MINT (minimum interval). One or a plurality of alarm events are transported in an alarm message from an intelligent alarm sensor to an alarm center.

If, for example, the observed pressure in a boiler exceeds a defined limit at an instant, this is referred to as an alarm event of the pressure alarm relative to this instant and this specific boiler. The alarm state is maintained until either the pressure drops or the alarm is reset.

The progression of time is shown on the abscissas of FIG. 1. The ticks of the global time are entered on time axis 100 from 00 to 40. In FIG. 1, the alarm event 150 of an alarm occurs at instant 02. At instant 27 this alarm is reset. In interval 120, which is between ticks 02 and 27, the active interval of the alarm, this alarm is in the active state. Because the minimum time interval (MINT) 110 between two alarm events of this alarm is 30 ticks, the next alarm event of this alarm can occur only after instant 32 (line 111), for example, as alarm event 151 at instant 37.

Figure 2:
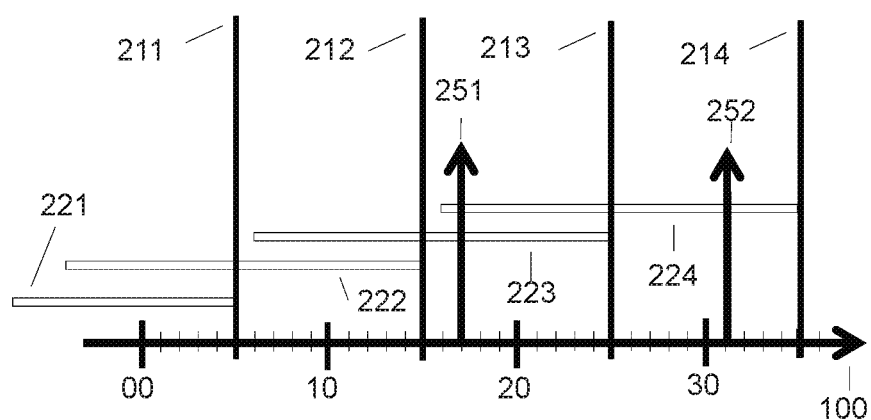

FIG. 2 shows four instants 05, 15, 25 and 35, at which the four alarm messages 211, 212, 213, 214 can be transmitted and the accompanying alarm monitoring intervals. At instant 05, alarm message 211 is transmitted at the end of alarm monitoring interval 221. At instant 15, alarm message 212 is transmitted at the end of alarm monitoring interval 222. At instant 25, alarm message 213 is transmitted at the end of alarm monitoring interval 223. At instant 35, alarm message 214 is transmitted at the end of alarm monitoring interval 224.

The time stamp of alarm event 251, which occurs at instant 17, is transported in the two alarm messages 213 and 214, which are transmitted at instants 25 and 35. Alarm event 252 is contained only in the alarm message transmitted at instant 35. In alarm message 213, the time stamp of alarm event 251 is 8 ticks; in alarm message 214 the time stamp of alarm event 251 is 18 ticks, and that of alarm event 252 is 4 ticks. The following alarm message (not visible in FIG. 2), which is transmitted at instant 45, includes alarm event 252, but not alarm event 251 (because it is outside of the monitoring interval of this alarm message). No alarm events are contained in alarm messages 211 and 212. Therefore, alarm messages 211 and 212 are not transmitted.

If the TT-Ethernet protocol [3] is used in the communication, the bandwidth that is freed up because of alarm messages not transmitted can be used for the transport of event messages.

Independent of the alarm messages, a time-triggered error detection message is transmitted periodically—for example, with an error detection message of 1 second—from an intelligent sensor to the alarm center in order to document the functionality of the intelligent alarm sensor. The state of all alarms that are active immediately before the transmission of the error detection message is contained in the error detection message (in each case 1 bit per alarm).

Figure 3:
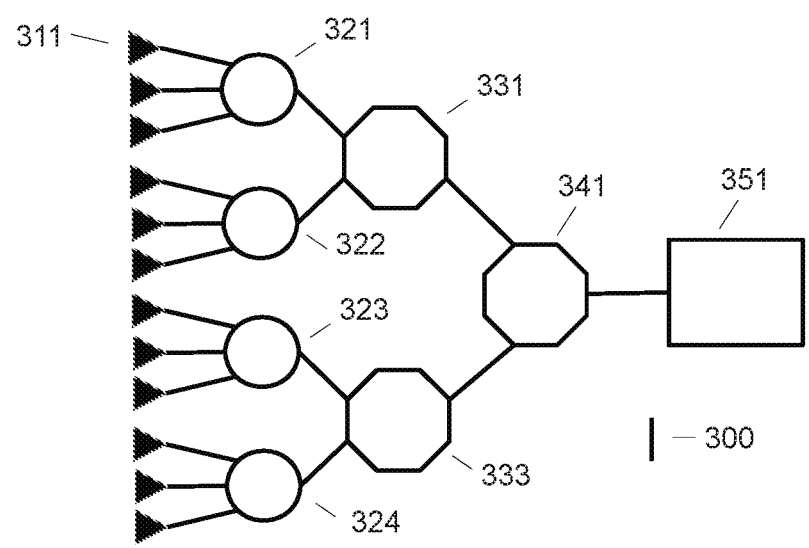

FIG. 3 shows a possible network topology of a distributed computer system. The black triangles 311 represent the alarm sources that are monitored by four intelligent alarm sensors 321, 322, 323 and 324.

Intelligent alarm sensor 321 transmits its alarm messages via distributor unit 331 and 341 to alarm center 351. Intelligent alarm sensor 322 transmits its alarm messages via distributor unit 331 and 341 to alarm center 351. Intelligent alarm sensor 323 transmits its alarm messages via distributor unit 333 and 341 to alarm center 351. Intelligent alarm sensor 324 transmits its alarm messages via distributor unit 333 and 341 to alarm center 351.

Preferably, the instants of the transmission of a plurality of alarm messages that are transmitted to the same distributor unit are synchronized in such a way that the alarm messages arrive simultaneously, so that the distributor unit can copy the contents of a plurality of arriving messages into a single new message.

For example, the alarm messages from intelligent alarm sensors 321 and 322 arrive simultaneously at distributor unit 331. Distributor unit 331 packs the contents of these two arriving messages into a new alarm message having a data field whose length results from the sum of the data fields of the received alarm messages. The distributor unit 333 behaves analogously. Subsequently, the alarm messages from 331 and 333 arrive simultaneously at distributor unit 341. Distributor unit 341 packs the contents of these two arriving messages into a new alarm message having a data field whose length results from the sum of the data fields of the received alarm messages and sends this message to alarm center 351. Through this process, the number of alarm messages is reduced, which results in an unburdening of the communication system.

The authenticity and integrity of the data content of an alarm message can be protected by an electronic signature.

Preferably, the electronic signature is first transmitted in the subsequent alarm message in order to prevent a delay of the alarm message.

LITERATURE CITED

[1] WO 2012085744. Aoun, M. et al. Device, system and method for handling alarm messages storms in a communication network.
[2] Kopetz, H. *Real-Time Systems—Design Principles for Distributed Embedded Applications*. Springer Verlag 2011.
[3] SAE Standard AS6802 of TT Ethernet. URL:http://standards.sae.org/as6802

The invention claimed is:

1. A method for the reliable transport of alarm messages in a distributed computer system, said computer system comprising a plurality of components, the components being node computers, distributor units, intelligent sensors, and intelligent actuators, wherein all of the components have access to a global time of known precision, and the node computers, intelligent sensors and intelligent actuators are configured to exchange messages via the distributor units, the method comprising:
assigning intelligent alarm sensors to the computer system or assigning the computer systems to intelligent alarm sensors, the intelligent alarm sensors being configured to monitor alarms; and
transmitting from an intelligent alarm sensor two types of time-triggered messages, a first type being alarm messages having an alarm transport period prescribed a priori, and a second type being error detection messages having an error detection period prescribed a priori,
wherein time stamps for an occurrence of an alarm event are included in an alarm monitoring interval, the alarm monitoring interval ending directly before the transmission of the alarm message and being at least twice as long as the alarm transport period, and an alarm message only being transmitted if at least one time stamp of the alarm event is included in the alarm message, and
wherein current states of all of the alarms that are active immediately before the transmission of the error detection message are included in the error detection messages, which are transmitted periodically.

2. The method of claim 1, wherein a position of the time stamp of the alarm event in the alarm message determines the significance of the alarm event.

3. The method of claim 1, wherein a transmission instant of the alarm message determines epochs for the time stamp of the alarm events that are contained in the alarm message, the time stamps of the alarm events being expressed in relation to the epochs.

4. The method of claim 1, wherein the global time of a transmission instant of a sporadic alarm message is contained in the alarm message.

5. The method of claim 1, wherein the instants of the transmission of a plurality of the alarm messages that are to be transmitted to a same one of the distributor units are synchronized in such a manner that the plurality of alarm messages arrive at the distributor unit simultaneously, and the contents of the plurality of simultaneously arriving alarm messages are combined into a new alarm message and in some cases are transmitted further.

6. The method of claim 1, wherein authenticity and integrity of data content of the alarm message are protected by an electronic signature, and the electronic signature is transmitted in a subsequent alarm message.

7. The method of claim 1, wherein communication between the components is controlled by TT-Ethernet protocol.

8. A distributed computer system comprising: a plurality of components which comprise
node computers,
distributor units,
intelligent sensors, and
intelligent actuators,
wherein all of the components have access to a global time of known precision, and the node computers, intelligent sensors and intelligent actuators are configured to exchange messages via the distributor units,
wherein the computer system includes intelligent alarm sensors or intelligent alarm sensors are assigned to the computer system, and the intelligent alarm sensors are configured to monitor alarms,
wherein for the reliable transport of alarm messages, an intelligent alarm sensor is configured to transmit two types of time-triggered messages, a first type being alarm messages having an alarm transport period prescribed a priori, and a second type being error detection messages having an error detection period prescribed a priori, wherein time stamps for an occurrence of an alarm event are included in an alarm monitoring interval, the alarm monitoring interval being configured to end directly before the transmission of the alarm message and configured to be at least twice as long as the alarm transport period, and
wherein an alarm message is only transmitted if at least one time stamp of the alarm event is included in the alarm message, and wherein current states of all of the alarms that are active immediately before the transmission of the error detection message are included in the error detection messages, which are transmitted periodically.

9. The computer system of claim 8, wherein a position of the time stamp of the alarm event in the alarm message determines the significance of the alarm event.

10. The computer system of claim 8, wherein a transmission instant of the alarm message determines epochs for the time stamp of the alarm events that are contained in the alarm message, the time stamps of the alarm events being expressed in relation to the epochs.

11. The computer system of claim 8, wherein the global time of a transmission instant of a sporadic alarm message is contained in the alarm message.

12. The computer system of claim 8, wherein the instants of the transmission of a plurality of the alarm messages that are to be transmitted to a same one of the distributor units are synchronized in such a manner that the plurality of alarm messages arrive at the distributor unit simultaneously, and the contents of the plurality of simultaneously arriving alarm messages are combined into a new alarm message and in some cases are transmitted further.

13. The computer system of claim 8, wherein authenticity and integrity of data content of the alarm message are protected by an electronic signature, which is configured to be transmitted in a subsequent alarm message.

14. The computer system of claim 8, which is configured to provide communication between the components controlled by the TT-Ethernet protocol.

* * * * *